United States Patent Office 2,726,949
Patented Dec. 13, 1955

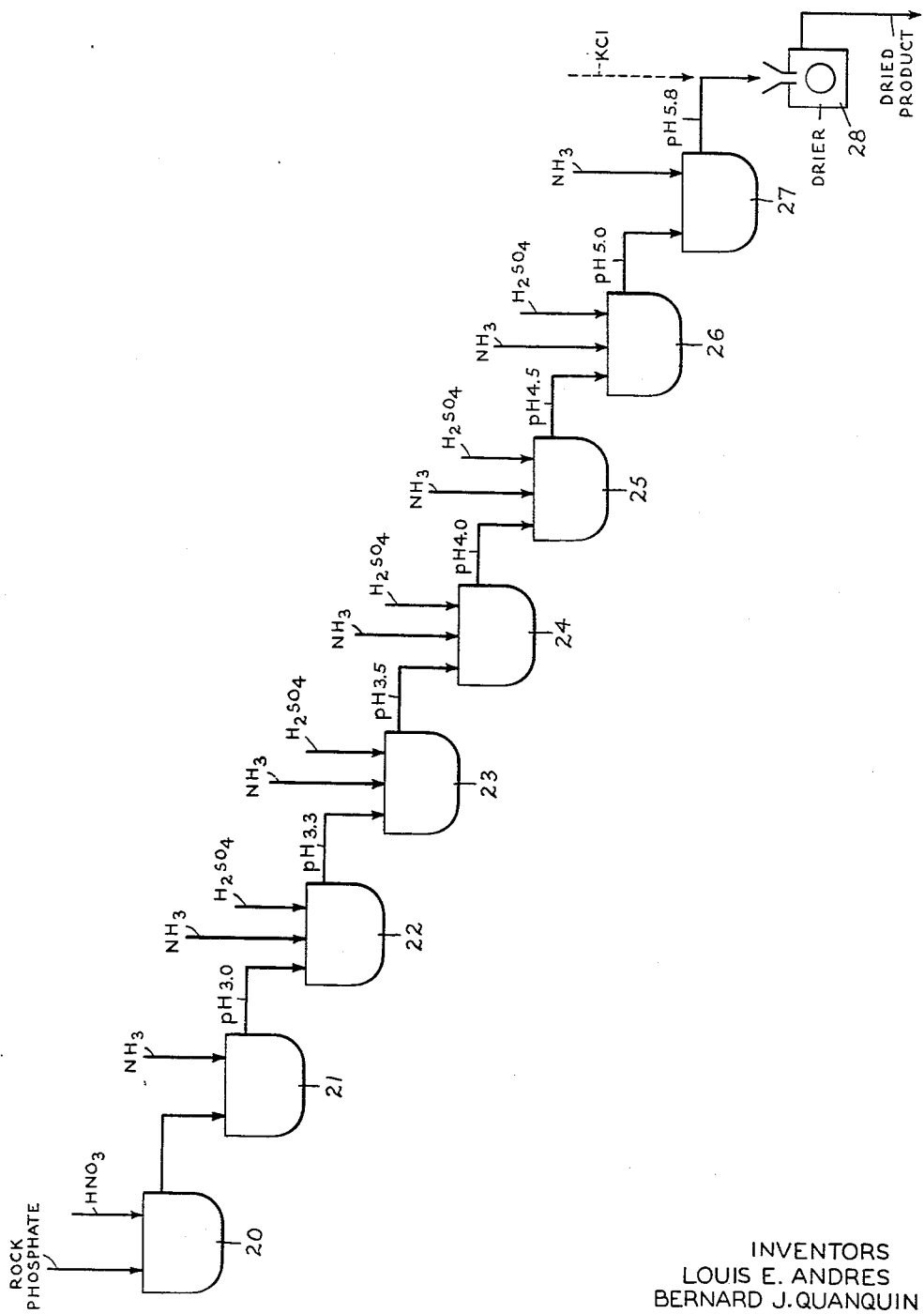

2,726,949
COMPLEX FERTILIZER AND METHOD OF PRODUCING SAME

Louis E. Andres, Saint Gratien, and Bernard J. Quanquin, Grand-Couronne, France, assignors to Potasse & Engrais Chimiques, Paris, France, a societe anonyme of France Application July 30, 1952, Serial No. 301,781

Claims priority, application France August 14, 1951

12 Claims. (Cl. 71—39)

This invention relates generally to fertilizers and more particularly to a method for producing complex fertilizers.

In the manufacture of fertilizers it has been common practice to mix simple fertilizers in their commercial form. For example, nitrogen is introduced by using ammonium nitrate, ammonium sulphate, Chilean nitrate, cyanamid; and phosphoric acid is introduced by using superphosphate, dicalcium phosphate, basic slags, or ammonium phosphates. Potash is added generally in the form of chloride, sylvanite or potassium sulphate. In brief, this type of fertilizer is produced by making a physical mixture of those ingredients and is known as a compound fertilizer.

Also known is the type of fertilizer called a "complex fertilizer." In producing this kind of fertilizer, instead of starting with simple fertilizer compounds already manufactured and then combined as a physical mixture, the process uses untreated or partially treated raw materials: nitric acid, raw phosphate, sulphuric acid, gaseous ammonia, and, if desired, potassium salts. These are treated in a series of operations which finally result in producing a fertilizer containing the plant elements chemically combined.

In manufacturing complex fertilizers, one of the first steps consists in reacting the raw phosphate rock with an acid to produce phosphoric acid after which the reaction product is treated with ammonia. One of the desired objectives is to convert the phosphate into a form which is soluble so that the phosphorus is readily available to the plants when the fertilizer is placed in the soil. It is, of course, known that phosphate in tricalcium form in a fertilizer is undesirable because according to the tests applied to fertilizer it is insoluble in water and ammonium citrate and in this form the phosphate is not available to the plants. The phosphate in dicalcium form is (according to tests applied to fertilizer) insoluble in water but soluble in ammonium citrate and is a desirable form, since in this form the phosphate is available to the plants. The phosphate in monocalcium form is soluble in water and, of course, the phosphorus in this form is available to plants. However, the monocalcium form is not desirable in a complex fertilizer because it has been found that the presence of phosphate in water soluble form causes the fertilizer to be unstable and fertilizers containing the phosphate in water soluble form do not stand up well and do not remain stable when stored for extended periods of time. Furthermore, the presence of the phosphate in monocalcium or water soluble form gives rise to the hazards of spontaneous combustion or explosion. Consequently, it is highly desirable that the phosphate in the fertilizer be in the dicalcium form because in this form it is not soluble in water but is soluble in ammonium citrate and is thus available to the plants when it is placed in the soil and the tricalcium form should be avoided because in this form the phosphate is not available to the plants, and the monocalcium form should be avoided for the reasons mentioned above.

It is an object of this invention to provide a process of producing a complex fertilizer which does not contain the phosphate in the monocalcium form and in which all of the phosphorus (calculated as $P_2O_5$) is in a form soluble in ammonium citrate. It is a further object of the invention to eliminate in the final product the tricalcium phosphate and monocalcium phosphate so that it contains substantially all of the phosphate in the dicalcium form, which is soluble in ammonium citrate but insoluble in water. Also, according to the process of the invention, the presence of calcium nitrate is avoided, it being known that the calcium nitrate because of its affinity for water causes the fertilizer to cake.

According to the process of the invention, rock phosphate is treated with nitric acid, then with ammonia, followed by treatment with ammonia and sulphuric acid in controlled amounts and finally with ammonia, these treatments being carried out within critical limits of control as will be described in further detail hereinafter. The rock phosphate is first attacked with nitric acid, this reaction producing phosphoric acid. To this reaction product is added ammonia until the reaction mass or slurry has a pH of about 3. Then ammonia and sulphuric acid are added in controlled relative amounts in such manner that the pH is gradually raised to about pH 5. Then ammonia alone is added to raise the pH to the neighborhood of 5.5 to 6.5. These steps are carried out under conditions which insure intimate mixing of the reactants and under conditions which prevent the temperature from rising substantially above 100° C. or going substantially below 90° C. and it is particularly significant to note that as increments of ammonia and/or sulphuric acid are added to the mass as the process proceeds, the pH should be raised gradually in comparable increments and as the process proceeds the pH should not be allowed to fall back as increments of ammonia and/or sulphuric acid are added but the pH should be gradually raised until the final pH in the neighborhood of 5.5 to 6.5 is reached.

By adding and reacting the ammonia which is preferably in gaseous form and the sulphuric acid as set forth above, all of the phosphoric acid produced from the phosphate rock is transformed into bicalcium phosphate and the calcium nitrate which may be formed is transformed into calcium sulphate, thereby eliminating from the finished product unwanted hygroscopic calcium nitrate.

Control of the temperature of the reacting masses between 90° C. and 100° C. is important. The reaction is exothermic and if the temperature is allowed to go higher than 100° C. an intense evaporation results and this causes the slurry to thicken undesirably and this makes it difficult to distribute the gaseous ammonia uniformly throughout the reacting mass and unless the ammonia is uniformly distributed the phosphoric acid in certain parts of the slurry will produce unwanted tricalcium phosphate which is insoluble in ammonium citrate. If the reactions are carried out at a temperature substantially below 90° C. the conditions of hydration of calcium sulphate and bicalcium phosphate are so modified that the slurry would get unduly thick and thus prevent a good absorption of the ammonia.

The amount of sulphuric acid ultimately to be added may be calculated on the basis of the analysis of the raw phosphate rock. For this purpose the phosphate rock may be considered on the basis of its phosphorus content in terms of $P_2O_5$ and its calcium content in terms of CaO. For example, tricalcium phosphate which may be represented by the formula $Ca_3(PO_4)_2$ may also be regarded as being composed of two oxides: $P_2O_5$, $(CaO)_3$. The raw rock phosphate may, and frequently does, contain an amount of calcium in excess of that required to combine with the phosphate to form tricalcium phosphate. That is, in tricalcium phosphate represented by the formula $(CaO)_3P_2O_5$, the percentage of CaO is 54.2+% and the percentage of $P_2O_5$ is 45.8−%. For purposes of calculation the formula for the rock phosphate may be regarded as $(CaO)_x.P_2O_5$, where $x$ represents the numerical value of the mols of CaO present for each mol of $P_2O_5$. If, for example, the percentage of CaO is higher than mentioned above so that there is present 3.6 mols of CaO for each mol of $P_2O_5$, this may be represented by the formula $P_2O_5(CaO)_{3.6}$. The amount of sulphuric acid to be added, according to the process of the invention, will be the equivalent amount which will react with $(x-2)$ CaO. Thus, according to the above explanation, if the rock phosphate is such as to be represented by the formula $P_2O_5(CaO)_{3.6}$, the amount of sulphuric acid to be added will be 1.6 mols of $H_2SO_4$ for each mol of $P_2O_5$ in the rock phosphate. The amount of ammonia to be added will be that required to raise the pH gradually as the sulphuric acid is added as described hereinafter.

In the final stage of the process when all of the sulphuric acid has been added and the reacting mass of slurry has reached a pH of about 5, by adding both ammonia and sulphuric acid, then ammonia only is added until the pH is in the neighborhood of 5.5 to 6.5. That is, the slurry is tested during the final stages of the reaction to determine whether there is still present any phosphate in water soluble form. If water soluble monocalcium phosphate is found to be present, sufficient ammonia is added to convert this into dicalcium phosphate, and when sufficient ammonia has been added as a final step to eliminate all phosphate in the water soluble monocalcium form, the pH will ordinarily be between 5.5 and 6.5, this variation depending upon variations encountered in different batches of raw phosphate rock.

The slurry thus obtained is then dried and subsequently granulated, producing a binary fertilizer (containing N and $P_2O_5$) which is stable, and having its $P_2O_5$ in the bicalcium form and substantially free from calcium nitrate, monocalcium phosphate and tricalcium phosphate.

If a ternary fertilizer (N, $P_2O_5$, $K_2O$) is wanted, a potassium salt in desired amount may be added to the slurry after the additions of ammonia and sulphuric acid have been completed and this will produce a complete fertilizer which contains the three plant food elements (N, $P_2O_5$, $K_2O$) in a complex fertilizer in which the plant food elements are chemically combined instead of being only a physical mixture of various fertilizer compounds.

The process of the invention may be carried out as a batch process or as a continuous or semi-continuous process.

As an example of carrying out a batch treatment on a small scale, 9.2 pounds of ground rock phosphate [containing 34% $P_2O_5$ and containing 3.6 mols of calcium (as CaO) per mol of $P_2O_5$ and regarded as being represented by the formula $P_2O_5(CaO)_{3.6}$] may be reacted with 16.5 pounds of 52% nitric acid in a water jacketed vessel to convert all the $P_2O_5$ to water soluble form. Cooling water is circulated in the jacket to control the temperature in the reacting mass of slurry, and the vessel should be provided with an agitator or stirring means to insure adequate mixing of the reactants during the process.

Upon completion of the attack on the phosphate rock by the nitric acid, gaseous ammonia is introduced into the slurry until pH 3 is reached. In this instance .46 pound of $NH_3$ will have been added. Then ammonia gas and sulphuric acid (98%) are simultaneously fed into the slurry which is constantly agitated to insure intimate mixing. In this early stage of the process the ammonia is introduced at a rate which corresponds to about half the weight of the sulphuric acid (98%). But in any event the relative amounts and rate of introduction of the ammonia and sulphuric acid is such that the pH of the slurry gradually rises but the amount of sulphuric acid and its rate of introduction should not at any time be such as to permit the pH to fall back and the rate of introducing the ammonia should be such that the pH rises only gradually and at a substantially uniform rate. Meantime the temperature is controlled by circulating cooling water through the jacket of the jacketed reacting vessel so that the temperature of the slurry is maintained between 90° C. and 100° C. After the slurry has reached pH 4 or thereabout, it will be found that the relative quantities of ammonia and sulphuric acid to obtain a comparable increment of increase in pH will vary from the ratio of ammonia and sulphuric acid introduced in the earlier stages of the process, bearing in mind that these reactants are introduced at a rate and in such proportion as will cause a gradual and substantially uniform rate of rise in the pH. In this instance, when the slurry has reached pH 4 it will have taken 1.32 additional pounds of gaseous ammonia above that required to raise the pH to 3 at the outset and 2.57 pounds of sulphuric acid (98%). To reach pH 4.5 the slurry will have taken up .23 additional pound of ammonia and .55 additional pound of sulphuric acid. When pH 5 has been reached, it will have taken up .18 additional pound of ammonia and .33 additional pound of sulphuric acid. Having reached a pH 5, there is then added to the slurry only ammonia to convert any monocalcium phosphate present to the dicalcium form. In this instance .13 pound of ammonia was required, bringing the pH of the slurry to 5.8.

The slurry when dried and granulated will produce a fertilizer product analyzing as follows: 16.5% of nitrogen of which 8.25% is in the $NO_3$ form and 8.25% is in the $NH_4$ form; a total of 14% phosphoric acid ($P_2O_5$) of which 13.85% is soluble in ammonium citrate; 0.15% insoluble in ammonium citrate, and no water soluble monocalcium phosphate.

In practising the invention on a large commercial scale, it has been found to be more expedient to carry out the process as a continuous one and this may be done by utilizing a plurality of water jacketed reaction vessels connected in series as indicated in the accompanying flow diagram shown in Fig. 1, wherein 20 represents a reaction chamber in which ground rock phosphate is reacted with nitric acid and 21 to 27 represent a series of water jacketed reaction vessels each representing a stage in the process as it proceeds and 28 represents a drying apparatus.

In a typical run, ground rock phosphate [containing 34% of $P_2O_5$ and 3.6 mols of CaO per mol of $P_2O_5$ and regarded as represented by formula $P_2O_5(CaO)_{3.6}$] was introduced into chamber 20 at the rate of 4180 kilos per hour and attacked by nitric acid (52%) introduced at the rate of 7500 kilos per hour. The products of the reaction of the phosphate rock and nitric acid were continuously delivered in series through seven water cooled reaction vessels each having a capacity of one and eight-tenths cubic meters and each equipped with agitators to insure a thorough mixing of the reactants. The reaction product from chamber 20 was continuously delivered to the first stage or vessel 21 wherein ammonia gas was introduced at the rate of 212 kilos per hour but no sulphuric acid. The temperature of the mass was maintained at 90° C. and the pH was 3. The slurry from the first stage was passed to the second stage or vessel 22 wherein ammonia at the rate of 200 kilos per hour and sulphuric acid (98%) at the rate of 390 kilos per hour were simultaneously added. The temperature was maintained at 100° C. and the slurry reached pH 3.3. The slurry from the second stage was passed to the third stage or vessel 23 wherein ammonia at the rate of 200 kilos per hour and sulphuric acid (98%) at the rate of 390 kilos per hour were simultaneously added. The temperature was maintained at 100° C. and the slurry reached pH 3.5. The slurry was then passed to the fourth stage or vessel 24 wherein ammonia at the rate of 200 kilos per hour and sulphuric acid at the rate of 390 kilos per hour were simultaneously added. The temperature was maintained at 100° C. and the slurry reached pH 4.0. The slurry was then passed to the fifth stage or vessel 25 wherein ammonia at the rate of 106 kilos per hour and sulphuric acid (98%) at the rate of 250 kilos per hour were simultaneously added. The temperature was maintained at 100° C. and the slurry reached pH 4.5. The slurry was then passed to the sixth stage or vessel 26 wherein ammonia at the rate of 85 kilos per hour and sulphuric acid (98%) at the rate of 150 kilos per hour were simultaneously added. The temperature was maintained at 100° C. and the slurry reached pH 5.0. The slurry was then passed to the seventh stage or vessel 27 wherein ammonia at the rate of 57 kilos per hour was added but no sulphuric acid. The temperature was maintained at 95° C. and the slurry reached pH 5.8. The slurry from the seventh stage was passed through drying apparatus 28 and granulated, producing ten metric tons of binary complex fertilizer per hour.

The foregoing procedure for treating the slurry after the phosphate rock has been attacked by the nitric acid in chamber 20 may be set forth in tabular form as follows:

| Stage | Ammonia (Kilos of $NH_3$) | Sulphuric Acid (Kilos 98% $H_2SO_4$) | pH | Temperature ° C. |
|---|---|---|---|---|
| 1 | 212 | 0 | 3.0 | 90 |
| 2 | 200 | 390 | 3.3 | 100 |
| 3 | 200 | 390 | 3.5 | 100 |
| 4 | 200 | 390 | 4.0 | 100 |
| 5 | 106 | 250 | 4.5 | 100 |
| 6 | 85 | 150 | 5.0 | 100 |
| 7 | 57 | 0 | 5.8 | 95 |

The slurry delivered from the seventh stage, after drying, produced ten metric tons of fertilizer product having the following analysis:

Nitrate nitrogen ($NO_3$) _____ 8.25% N.
Ammoniacal nitrogen ($NH_4$) _____ 8.25% N.
Phosphoric acid ($P_2O_5$) total _____ 14.00% $P_2O_5$.
Phosphoric acid soluble in ammonium citrate _____ 13.85% $P_2O_5$.
Phosphoric acid insoluble in ammonium citrate _____ 0.15% $P_2O_5$.
Phosphoric acid soluble in water _____ 0.0%.

Although the process as carried out on a large commercial scale has been illustrated as having been divided into seven stages in series, it will be understood that this is primarily for purposes of illustrating one manner of practising the method of the invention. It will be understood that a greater or less number of separate stages may be employed. The significant point is that the process is carried out in such fashion that the ammonia and/or sulphuric acid are added in increments and in ratio such that as the process goes forward, after the initial stage of adjusting the pH of the slurry to about 3, the reactants are added in such proportion and rate that the pH of the slurry is caused to rise gradually in small increments to the last stage and prevented from falling lower than it had been in any previous stage and in the last stage ammonia only is added to the extent required to convert any phosphate existing in the monocalcium form to the bicalcium form.

If it is desired to produce a ternary fertilizer (containing N, $P_2O_5$, $K_2O$) the desired quantity of a potassium salt such as potassium chloride (KCl) may be added to the slurry delivered from the final stage, that is, stage 7 as indicated in the flow sheet and intimately intermixed after which the slurry containing the added potassium may be dried and granulated to produce a ternary fertilizer which is a complete and stable fertilizer which can be stored, as can the binary fertilizer above described, for extended periods of time without disintegration or deterioration.

For example, in the continuous process above described, if 2750 kilos of potassium chloride (60% $K_2O$) is added to the slurry after all of the sulphuric acid and ammonia has been added, and then intimately mixed and the mixture then dried, there is produced 12.750 metric tons of ternary fertilizer which analyzes as follows: 6.4% N as $NO_3$; 6.4% N as $NH_4$; 11% $P_2O_5$ of which 10.9% is soluble in ammonium citrate; 0.1% insoluble in ammonium citrate; no water soluble $P_2O_5$; and 12.9% water soluble potassium calculated as $K_2O$.

The fertilizer obtained by the method of the invention, having no monocalcium phosphate present which is the water soluble form, can be stored indefinitely in bulk without risk of decomposition or alteration and there is no risk of spontaneous combustion as is the case with fertilizers which contain water soluble monocalcium phosphate. The final product is substantially free of tricalcium phosphate and the phosphate is present as bicalcium phosphate. And the process avoids the presence in the fertilizer of calcium nitrate which is hygroscopic and therefore undesirable.

The terms and expressions which have been employed herein are used as terms of description and not of limitation, and there is no intention in the use of such terms and expressions of excluding any equivalent of the features shown and described or portions thereof, but it is recognized that various modifications are possible within the scope of invention claimed.

What is claimed is:

1. A method of producing a complex fertilizer from water insoluble phosphate rock containing phosphorus and calcium which when calculated as $P_2O_5$ and CaO may be represented by the formula $P_2O_5(CaO)_x$ where $x$ represents the numerical value of mols of CaO to each mol of $P_2O_5$ in said rock which method comprises reacting said rock phosphate with nitric acid in sufficient amount to form a slurry in which all the phosphate is converted to phosphoric acid form which is water soluble, then adding sufficient ammonia to said slurry to adjust its pH to about 3, then gradually adding to the resulting slurry sulphuric acid in an amount equivalent to $x-2$ mols of $H_2SO_4$ for each mol of $P_2O_5$ present in the slurry and simultaneously while adding said sulphuric acid also adding ammonia gradually in an amount and at a rate and in a ratio to the sulphuric acid to cause the pH of the slurry gradually to rise to a pH of about 5, and then adding sufficient ammonia alone to the slurry to raise the pH of the slurry to the neighborhood of 5.5 to 6.5 thereby to convert any existing monocalcium phosphate to dicalcium phosphate and avoiding the formation of unwanted tricalcium phosphate and then drying the slurry.

2. A method according to claim 1 in which a potassium salt is added to the slurry prior to drying.

3. A method of producing a complex fertilizer from natural water insoluble phosphate rock containing phosphorus and calcium which when calculated as $P_2O_5$ and CaO may be represented by the formula $P_2O_5(CaO)_x$ where $x$ represents the number of mols of CaO in said rock for each mol of $P_2O_5$ present in said rock which method comprises reacting said rock phosphate with sufficient nitric acid to form a slurry in which all the phosphate is converted to acid form and completely water soluble, then adding sufficient ammonia to said slurry to adjust its pH to about 3, then gradually adding to the resulting slurry sulphuric acid in an amount at least equivalent to $x-2$ mols of $H_2SO_4$ for each mol of $P_2O_5$ present in said slurry and simultaneously while gradually adding said sulphuric acid adding ammonia gradually to said slurry in an amount and at a rate and in a ratio to the sulphuric acid to cause the pH of the slurry gradually to rise to a pH of about 5 while maintaining the temperature of the slurry in a range not substantially higher than 100° C. and not substantially lower than 90° C., and then raising the pH of said slurry to the neighborhood of 5.5 to 6.5 by the addition of ammonia alone, then drying the slurry, thereby to produce a complex fertilizer substantially free from tricalcium phosphate and water soluble monocalcium phosphate and having substantially all of its phosphate in bicalcium form soluble in ammonium citrate.

4. A method according to claim 3 in which a potassium salt capable of producing $K_2O$ is added to the slurry prior to drying.

5. A method of producing a complex fertilizer which comprises forming a slurry by reacting rock phosphate in which the phosphate and calcium present in the rock phosphate may be represented by the formula $P_2O_5(CaO)_x$ where $x$ equals the number of mols of CaO present for each mol of $P_2O_5$ present in the rock phosphate, with sufficient nitric acid to convert all the phosphate to water soluble phosphoric acid form, then while maintaining the slurry at a temperature between 90° C. and 100 C., adding sufficient ammonia to raise the pH to about 3 and thereafter adding sulphuric acid and ammonia to said slurry at a rate and in proportions gradually to raise the pH of said slurry to about 5, the amount of sulphuric acid added being the equivalent amount to react with $(x-2)$CaO for each mol of $P_2O_5$ present in the rock phosphate, then adding sufficient ammonia to raise the pH of the slurry to between 5.5 and 6.5 and then drying said slurry, thereby to produce a fertilizer free from water soluble monocalcium phosphate and having substantially all of its phosphate content in a form which is soluble in ammonium citrate.

6. A method according to claim 5 in which a potassium salt is added to the slurry after the sulphuric acid and ammonia additions.

7. A method of manufacturing a complex fertilizer in which substantially all of the $P_2O_5$ is present in a form which is soluble in ammonium citrate and which complex fertilizer is substantially free from water soluble $P_2O_5$ and containing nitrogen as $NO_3$, nitrogen as $NH_4$ and phosphorus as $P_2O_5$ by the attack of natural rock phosphate with sufficient nitric acid to render all the phosphate in the rock water soluble and additions of ammonia and sulphuric acid the said rock being represented by the formula $P_2O_5(CaO)_x$ where $x$ represents the number of mols of CaO per mol of $P_2O_5$ which method comprises adding ammonia to the slurry resulting from the reaction of the rock phosphate and nitric acid in such amount as to bring the pH to 3, then gradually adding to said slurry $H_2SO_4$ in an amount equivalent to $x-2$ mols where $x$ represents the number of mols of Ca to each mol of $P_2O_5$ in the rock phosphate and adding ammonia simultaneously with said $H_2SO_4$ in such proportion as to gradually increase the pH of the slurry until it reaches 5 and then adding ammonia alone until the slurry does not contain any phosphoric acid in water soluble form and meanwhile maintaining the temperature of the slurry between 90° and 100° during the time the additions are made.

8. A method according to claim 7 in which a potassium salt is added to the slurry after the sulphuric acid and ammonia additions.

9. A continuous process of producing a complex fertilizer containing nitrate nitrogen, ammoniacal nitrogen and phosphate in bicalcium form which comprises continuously delivering to a reaction chamber ground phosphate rock together with sufficient nitric acid to form a stream of slurry in which the phosphate present in the rock is converted to phosphoric acid form soluble in water, continuously delivering said stream of slurry through a plurality of reaction vessels in series, wherein ammonia is continuously introduced into the first and last of said vessels and both ammonia and sulphuric acid are continuously introduced into the intermediate vessels between said first and last vessels, ammonia being continuously introduced into said first vessel at a rate sufficient to maintain the stream of slurry in said first vessel at about pH 3, ammonia and sulphuric acid being simultaneously introduced into said intermediate vessels at a rate and in proportion to raise the pH of said stream as said stream of slurry passes therethrough to a pH higher than that of the stream of slurry in any vessel it has passed through and maintaining the pH of said stream at about 5 when it enters said last vessel, continuously introducing ammonia into said last vessel at a rate to maintain the pH of the stream of slurry delivered therefrom higher than 5.5 and thereafter drying the slurry.

10. A method according to claim 9 in which prior to drying, a potassium salt is intermixed with the slurry.

11. A continuous process of producing a complex fertilizer containing nitrate nitrogen, ammoniacal nitrogen and phosphate in bicalcium form which comprises continuously delivering to a reaction chamber ground phosphate rock, containing phosphorus and calcium which may be represented by the formula $P_2O_5(CaO)_x$ where $x$ equals the number of mols of CaO to each mol of $P_2O_5$ in the rock, together with sufficient nitric acid to form a stream of slurry in which the phosphate present in the rock is converted to phosphoric acid in water soluble form, continuously delivering said stream of slurry through a plurality of reaction vessels in series, wherein ammonia is continuously introduced into the first and last of said vessels and both ammonia and sulphuric acid are continuously introduced into the intermediate vessels between said first and last vessels, ammonia being continuously introduced into said first vessel at a rate sufficient to maintain the stream of slurry in said first vessel at about pH 3, both ammonia and sulphuric acid being simultaneously introduced into said intermediate vessels at a rate and in proportion to raise the pH of said stream as said stream of slurry passes therethrough to a pH higher than that of the stream of slurry in any vessel it has passed through and maintaining the pH of said stream at about 5 when it enters said last vessel, the amount of sulphuric acid introduced into said intermediate vessels amounting at least to $x-2$ mols of $H_2SO_4$ for each mol of $P_2O_5$ in the slurry passing therethrough, continuously introducing ammonia into said last vessel at a rate to maintain the stream of slurry delivered therefrom between pH 5.5 and pH 6.5, said stream of slurry at all times being maintained in a temperature range of the order of 90° to 100° C. and thereafter drying the slurry.

12. A method according to claim 11 in which a potassium salt is added to the slurry prior to drying.

References Cited in the file of this patent

UNITED STATES PATENTS

| Number | Name | Date |
| --- | --- | --- |
| 1,788,828 | Goldberg | Jan. 13, 1931 |
| 1,948,520 | Harvey | Feb. 27, 1934 |
| 2,555,634 | Bruijn et al. | June 5, 1951 |
| 2,555,656 | Plusje et al. | June 5, 1951 |
| 2,611,691 | Tramm | Sept. 23, 1952 |

FOREIGN PATENTS

| Number | Country | Date |
| --- | --- | --- |
| 1,644 | Great Britain | May 19, 1874 |
| 340,120 | Great Britain | Dec. 24, 1930 |
| 352,739 | Great Britain | July 16, 1931 |
| 430,380 | Great Britain | June 18, 1935 |

OTHER REFERENCES

Ammoniated Phosphate, R. S. McBride, Chem. and Metallurgical Eng., vol. 36, No. 10, Oct. 1929, pages 592–595.